(12) United States Patent
Aizawa et al.

(10) Patent No.: US 7,686,458 B2
(45) Date of Patent: Mar. 30, 2010

(54) SUPPORTING MECHANISM OF REFLECTOR AND PROJECTION APPARATUS

(75) Inventors: Jyunichi Aizawa, Tokyo (JP); Akihisa Miyata, Tokyo (JP)

(73) Assignee: Mitsubishi Electric Corporation, Tokyo (JP)

(*) Notice: Subject to any disclaimer, the term of this patent is extended or adjusted under 35 U.S.C. 154(b) by 680 days.

(21) Appl. No.: 11/659,822

(22) PCT Filed: Aug. 10, 2005

(86) PCT No.: PCT/JP2005/014619

§ 371 (c)(1),
(2), (4) Date: Feb. 9, 2007

(87) PCT Pub. No.: WO2006/019018

PCT Pub. Date: Feb. 23, 2006

(65) Prior Publication Data

US 2007/0195441 A1    Aug. 23, 2007

(30) Foreign Application Priority Data

Aug. 18, 2004  (JP) ............................. 2004-238481

(51) Int. Cl.
*G03B 21/28* (2006.01)
(52) U.S. Cl. ........................................... 353/98; 353/77
(58) Field of Classification Search .................. 353/77, 353/78, 79, 98; 348/745; 359/849, 871, 359/872, 881
See application file for complete search history.

(56) References Cited

U.S. PATENT DOCUMENTS 6,494,583 B2 * 12/2002 Lu ................................ 353/98
6,631,994 B2   10/2003 Suzuki et al.
6,719,432 B2 *  4/2004 Chen et al. ...................... 353/74
6,773,115 B2 *  8/2004 Tseng et al. ..................... 353/78
6,824,274 B2   11/2004 Suzuki et al.
7,055,960 B2 *  6/2006 Chang et al. .................... 353/77
2002/0186352 A1 * 12/2002 Chen et al. ...................... 353/98

FOREIGN PATENT DOCUMENTS

| CN | 1380989 A  | 11/2002 |
|----|------------|---------|
| JP | 2-119633 U | 9/1990  |
| JP | 4-5659 A   | 1/1992  |
| JP | 9-21629 A  | 1/1997  |
| JP | 9-138349 A | 5/1997  |

(Continued)

*Primary Examiner*—William C Dowling
(74) *Attorney, Agent, or Firm*—Birch, Stewart, Kolasch & Birch, LLP

(57) ABSTRACT

A reflection surface (1a) of a mirror (1) has a rotationally-symmetrical shape about an optical axis (110). The mirror (1) is rotatably supported by a pivot supporting portion (41) on the position of the optical axis (110) of the reflection surface (1a) or in the vicinity of the optical axis (110). Furthermore, the mirror (1) is slidably supported by slide supporting portions (42) at two positions on the upper part thereof. With such a configuration, the mirror (1) is supported at three points. Further, even when the mirror (1) expands and contracts due to the change in temperature or the like, the deformation of the reflection surface (1a) of the mirror (1) is prevented by the action of the slide supporting portions (42). As a result, it is possible to prevent the generation of distortion of an image projected on a screen (300).

10 Claims, 14 Drawing Sheets

FOREIGN PATENT DOCUMENTS

| | | |
|---|---|---|
| JP | 11-249234 A | 9/1999 |
| JP | 2000-28864 A | 1/2000 |
| JP | 2001-210590 A | 8/2001 |
| JP | 2001-296466 A | 10/2001 |
| JP | 2002-207155 A | 7/2002 |
| JP | 2002-341229 A | 11/2002 |
| JP | 2003-215713 A | 7/2003 |
| JP | 2004-133483 A | 4/2004 |

* cited by examiner

SUPPORTING MECHANISM OF REFLECTOR AND PROJECTION APPARATUS

TECHNICAL FIELD

This invention relates to a supporting mechanism of a reflector of a projection apparatus used in, for example, a projector or the like, and relates to a projection apparatus using same.

BACKGROUND ART

In a projection apparatus used in a projector, a mirror having a reflection surface needs to be disposed in the projection apparatus with a high positioning accuracy. Therefore, conventionally, the mirror is fixed onto a fixing member provided in the projection apparatus by means of a number of screws or the like. For this reason, if the mirror expands and contracts due to the change in temperature, humidity or the like, a stress may be originated from a portion fixed by the screw may be accumulated inside the mirror, and the shape of the reflection surface of the mirror may be deformed by the stress. As a result, if there is a change in temperature, humidity or the like, there is a problem that the distortion may occur in an optical image emitted by the projection apparatus, and therefore a large distortion may occur in an output image of the projector.

In order to solve this problem, the following mirror supporting mechanism has been proposed. This mirror supporting mechanism includes a supporting frame formed to locally contact the front surface side of the mirror, a backside member fixed to the supporting frame so that the backside member faces the backside of the mirror with a gap formed therebetween, and a pushing member that pushes the mirror frontward against the backside member. The mirror is slidably sandwiched between the supporting frame and the pushing member, so as to relax the accumulation of stress inside the mirror due to the expansion and contraction of the mirror, and to reduce the deformation of the shape of the reflection surface of the mirror (see for example, Patent Document 1).

Patent Document 1: Japanese Laid-open Patent Publication No. 2003-215713 (paragraph 0018, FIG. 4)

DISCLOSURE OF THE INVENTION

Problems to be Solved by the Invention

However, in the conventional mirror supporting mechanism, the mirror is supported in such a manner that the mirror directly contacts a rod-like holder (pushing member) and a plurality of contact portions of the supporting frame. Therefore, in order to enhance the positioning accuracy of the mirror, it is necessary to prepare the holder, the supporting frame and the backside member machined with high accuracy, so that there is a problem that cost increases. Further, if the machining accuracy is low, a gap may be formed in between the mirror and the respective contact portion, and the deformation of the mirror may occur when the mirror is pushed by a spring mounted on the holder. As a result, the direction of the reflection light partially varies, and therefore there is a problem that a distortion may occur in the output image of the projector, and the intended quality cannot be ensured.

The present invention is intended to solve the above described problems, and the object of the present invention is to provide a supporting mechanism of a reflector capable of preventing the occurrence of the large distortion in an image irrespective of the change in temperature, humidity or the like, even when components machined with low accuracy are used.

Means of Solving Problems

A supporting mechanism of a reflector according to the present invention includes a pivot supporting portion that rotatably supports a reflector at a position of an optical axis of a reflection surface thereof or in the vicinity of the optical axis.

EFFECT OF THE INVENTION

According to the present invention, even when the temperature, humidity or the like changes, the reflector (a mirror or the like) freely expands and contracts about the pivot supporting portion. Therefore, the distortion may hardly occur in the reflector, and the deformation of the shape of the reflection surface of the reflector can be minimized. As a result, the occurrence of the large distortion in the optical image projected by the projection apparatus can be prevented. Further, the reflector is supported by the pivot supporting portion provided at one place, and therefore the position of the reflector can freely be adjusted, irrespective of the accuracy of components such as the reflector, supporting parts thereof or the like. As a result, the cost can be reduced.

DESCRIPTION OF REFERENCE MARKS

1 ... mirror (reflector), 1a ... reflection surface, 3 ... fixing member, 4 ... first lug, 5 ... second lug, 41 ... pivot supporting portion, 42 ... slide supporting portion, 100 ... projection optical system, 110 ... optical axis, 200 ... illumination optical system, 1000 ... projector.

BEST MODE FOR CARRYING OUT THE INVENTION

Embodiment 1

Figure 1:
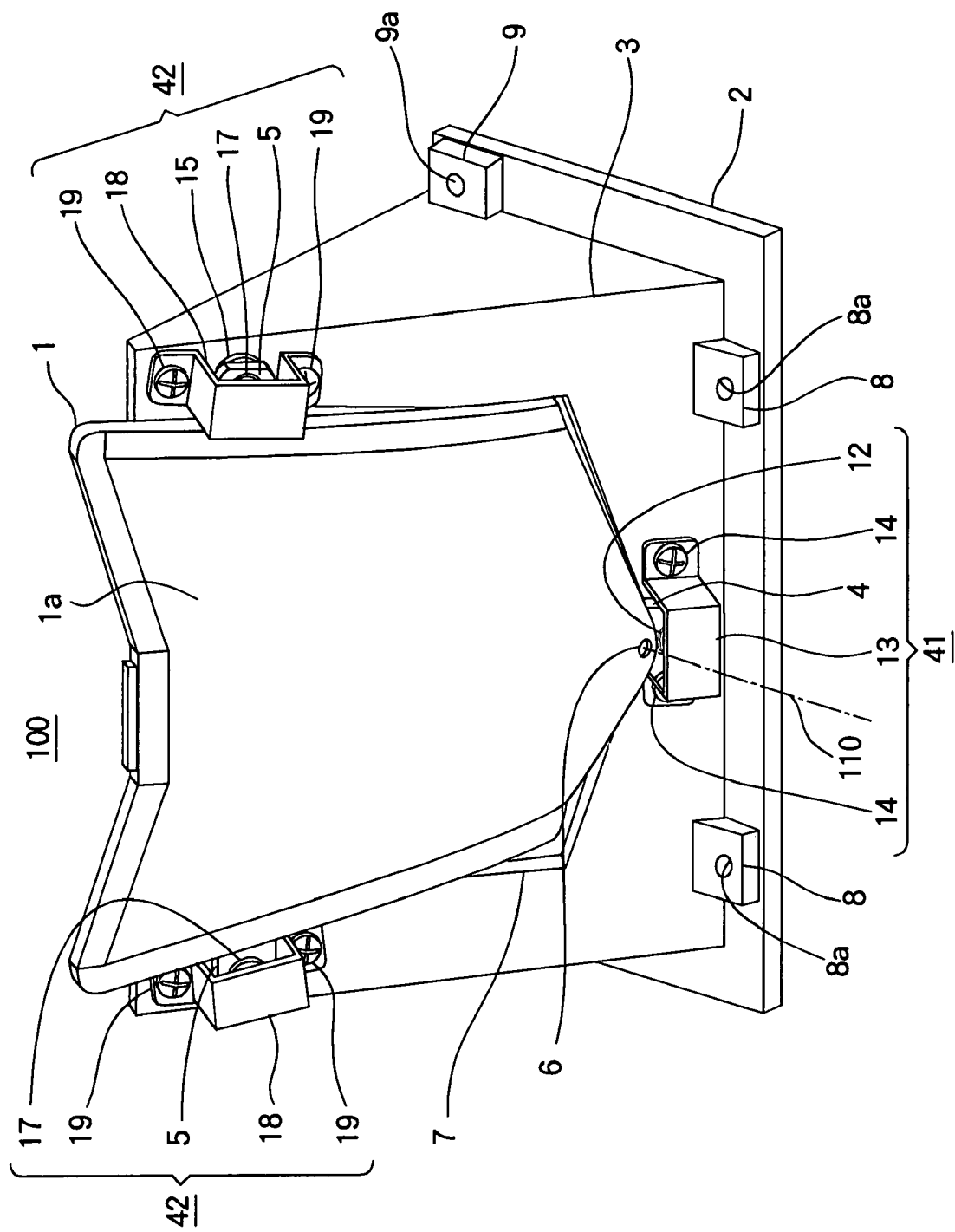
FIG. 1 is a perspective view of a supporting mechanism of a mirror according to Embodiment 1 of the present invention.
Figure 2:
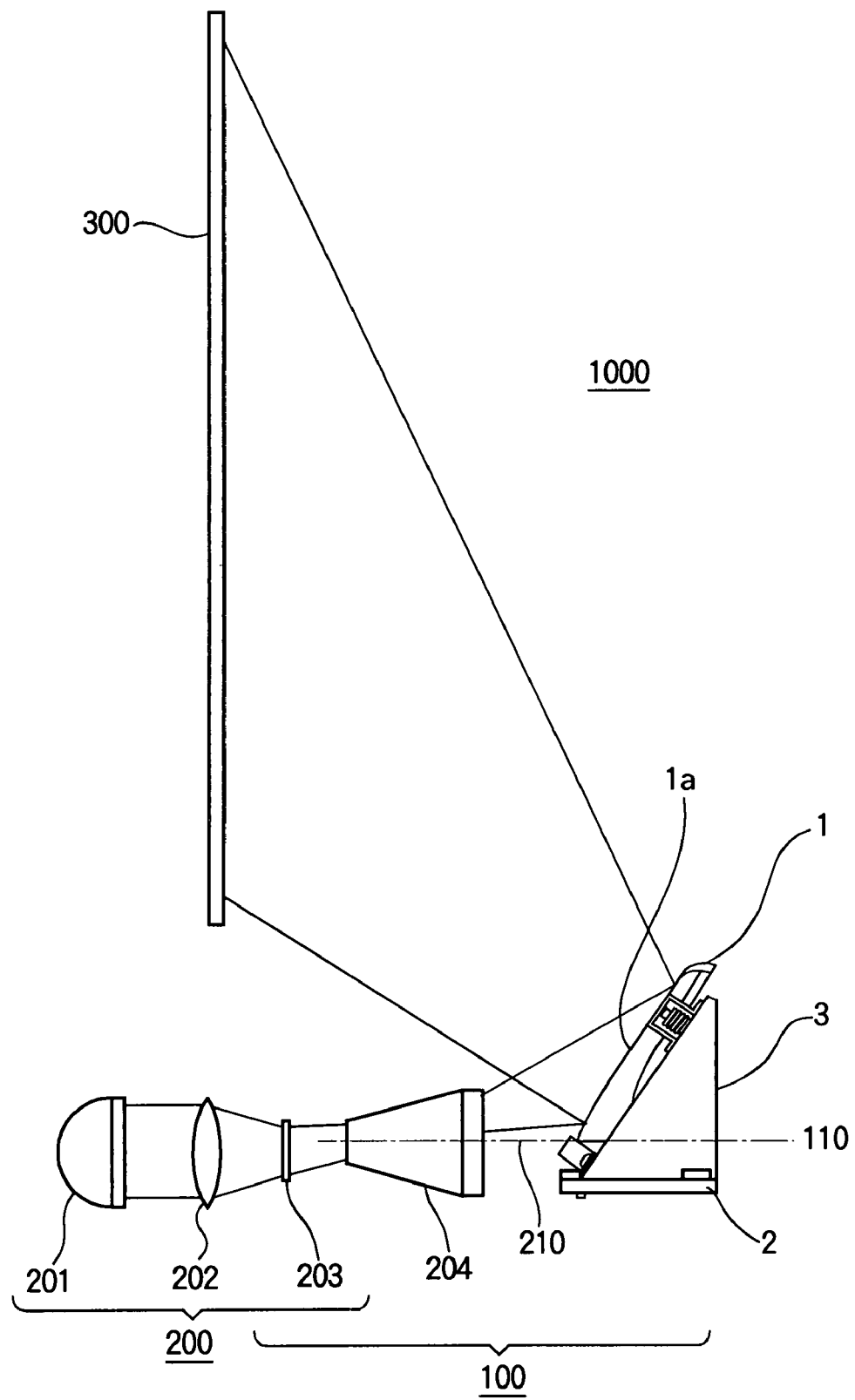
FIG. 2 is a schematic view of a whole configuration of a projector including a projection apparatus using the supporting mechanism of the mirror according to Embodiment 1 of the present invention.
Figure 3:
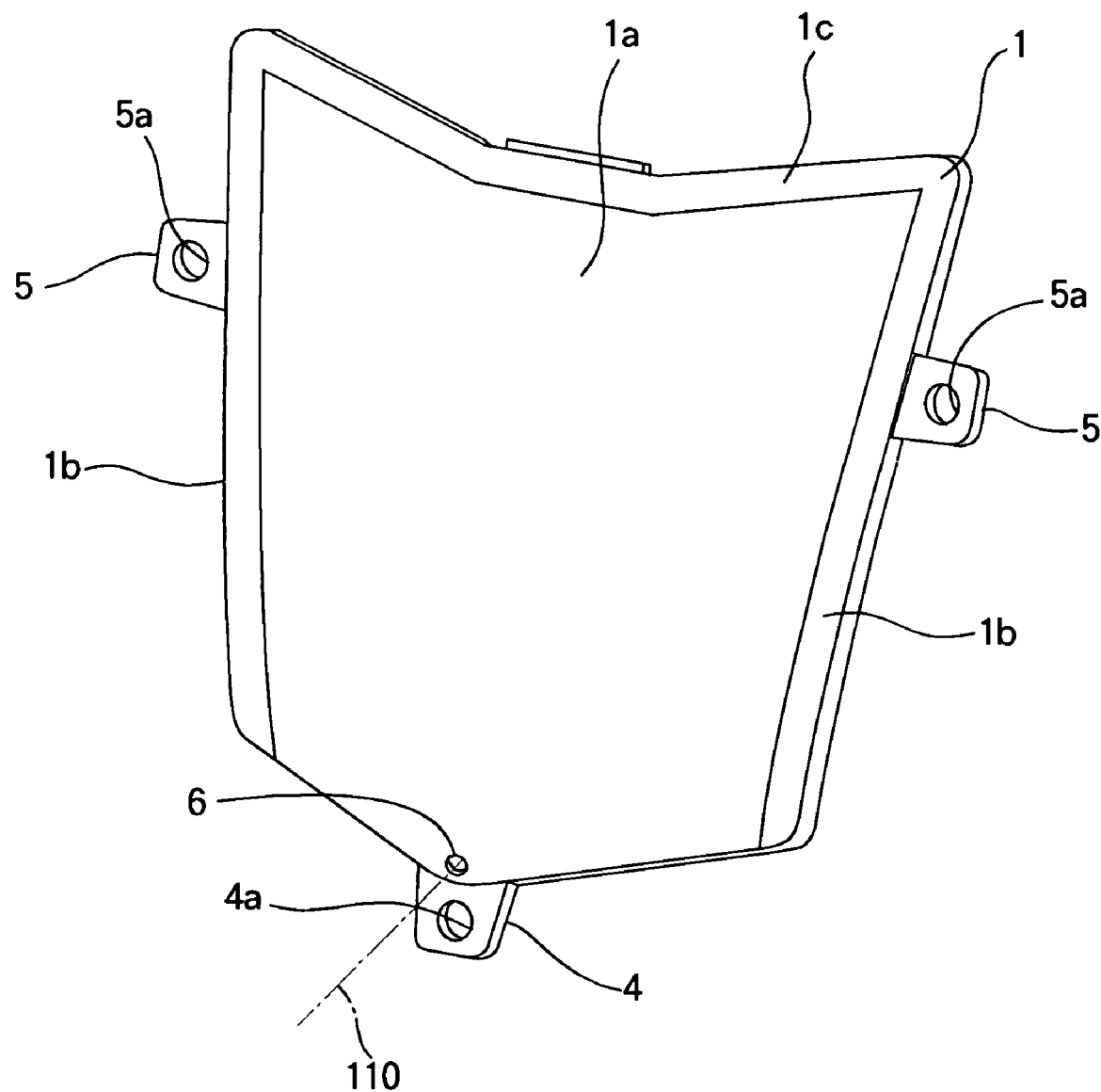
FIG. 3 is a perspective view of the mirror according to Embodiment 1 of the present invention.
Figure 4:
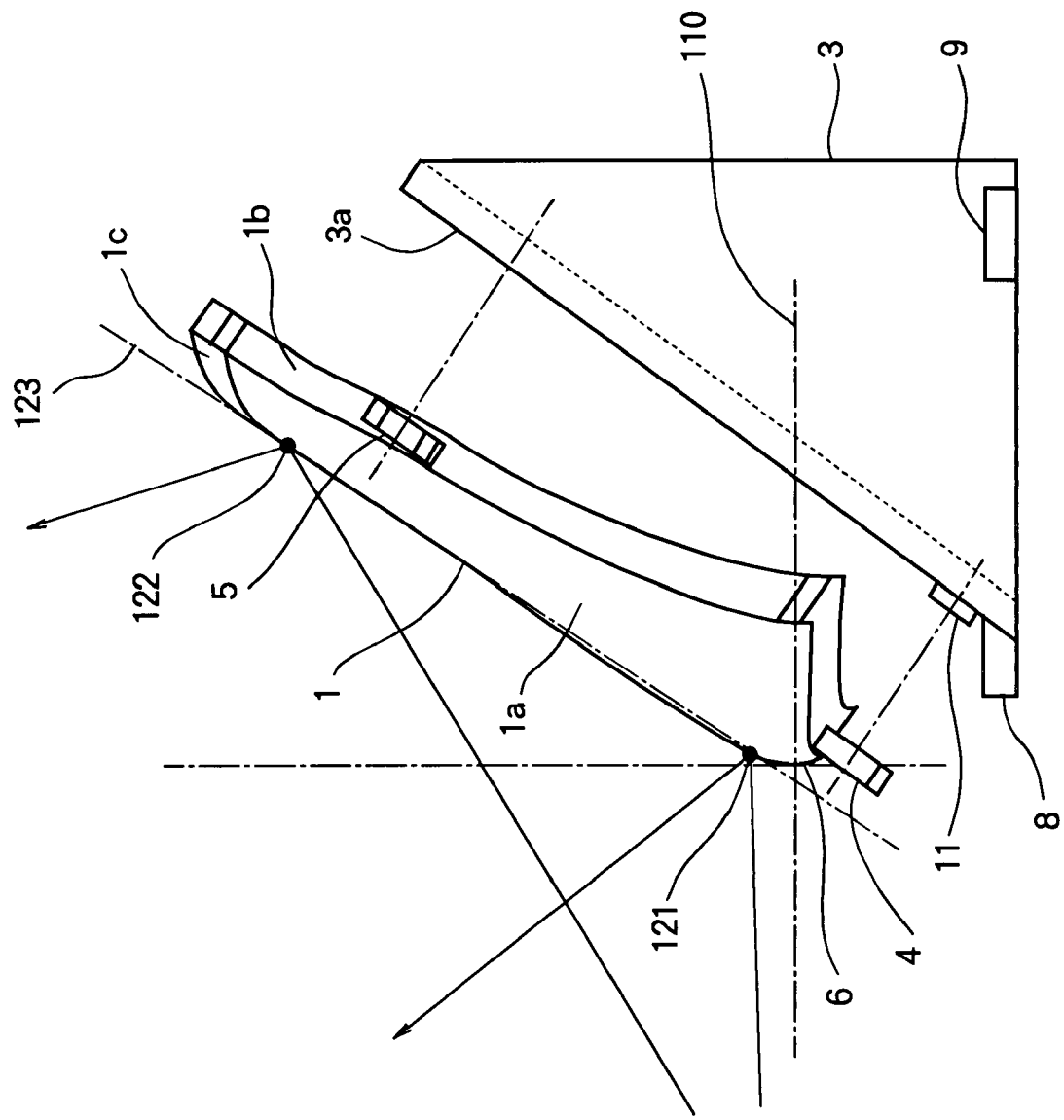
FIG. 4 is a side view of the supporting mechanism of the mirror according to Embodiment 1 of the present invention.
Figure 5:
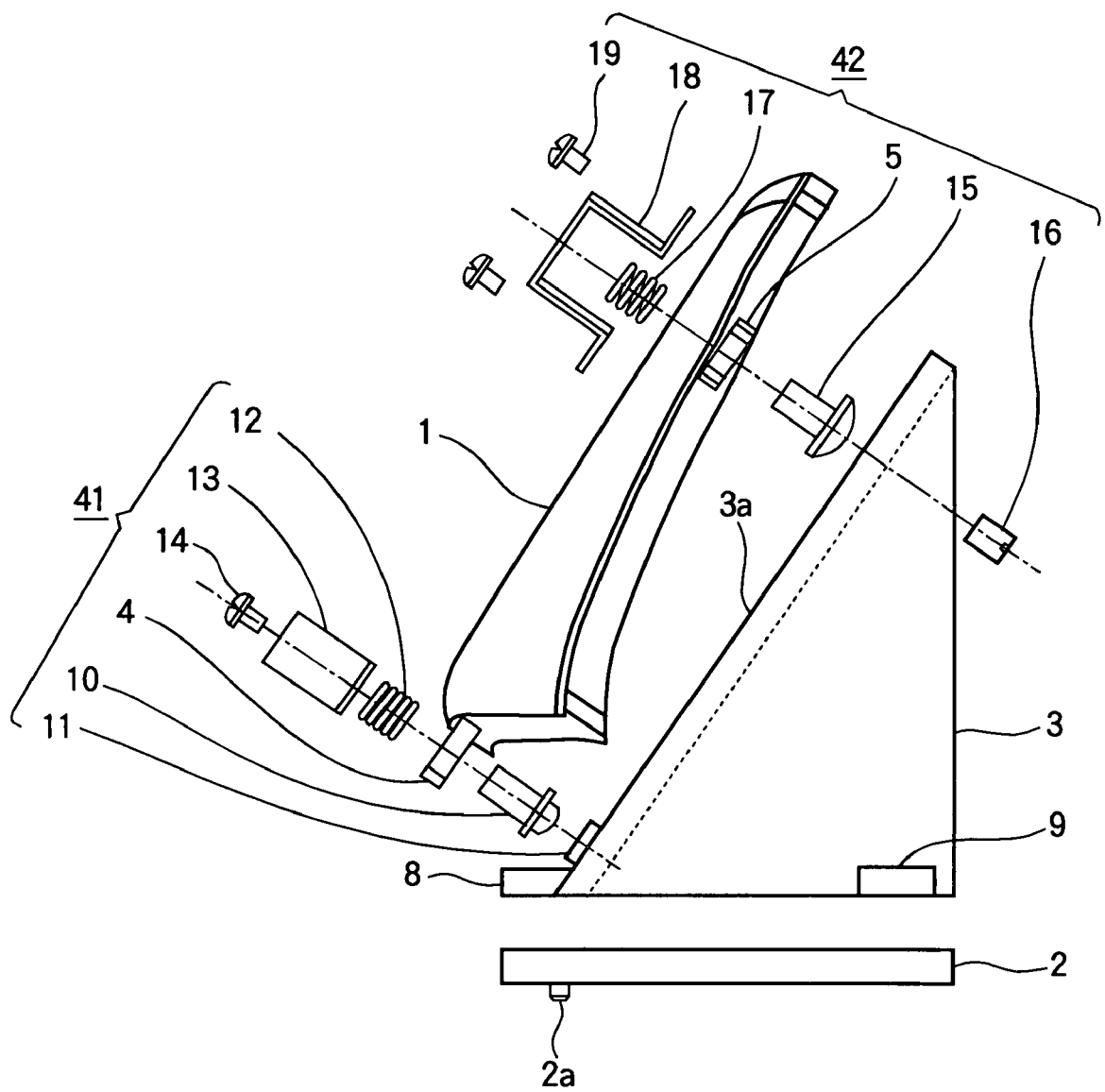
FIG. 5 is a side view showing the supporting mechanism of the mirror according to Embodiment 1 of the present invention in an exploded manner.
Figure 6:
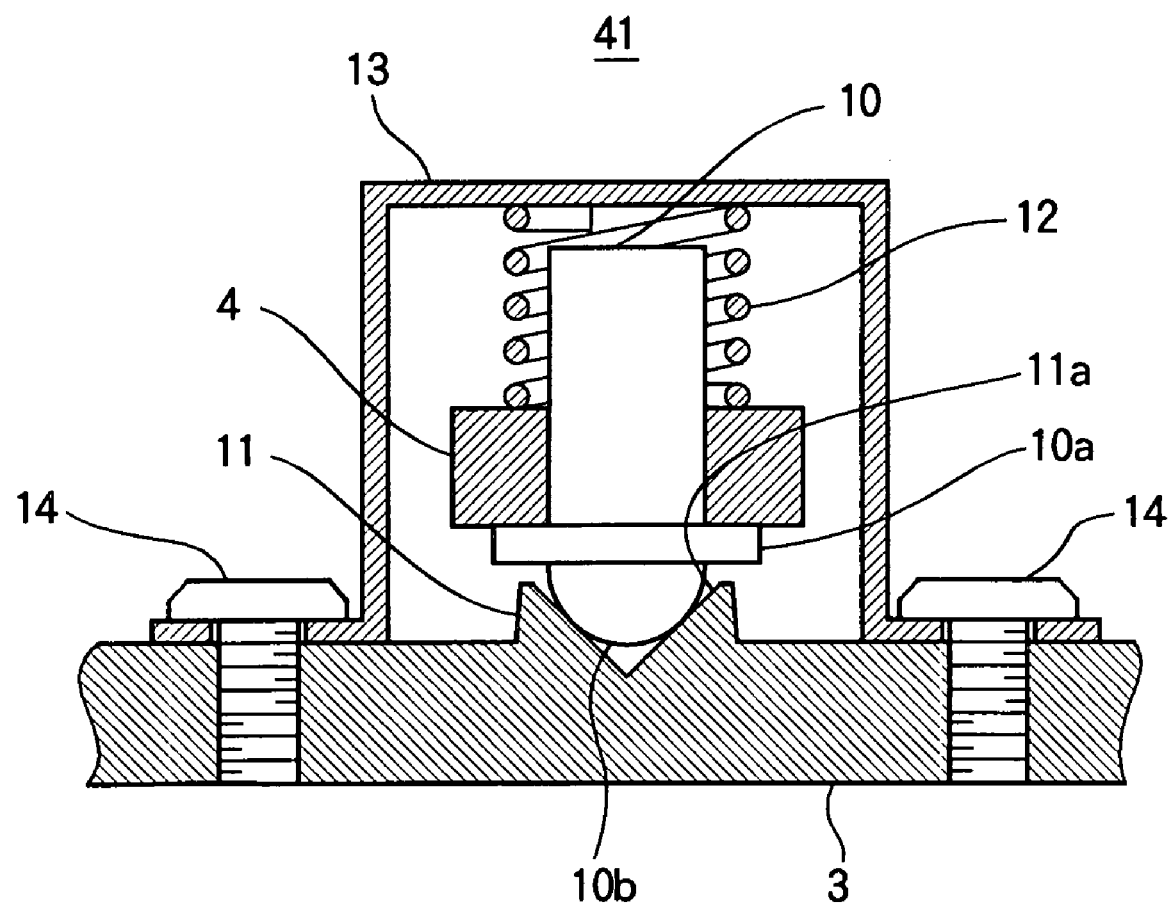
FIG. 6 is a cross-sectional view of a pivot supporting portion of the supporting mechanism of the mirror according to Embodiment 1 of the present invention.
Figure 7A:
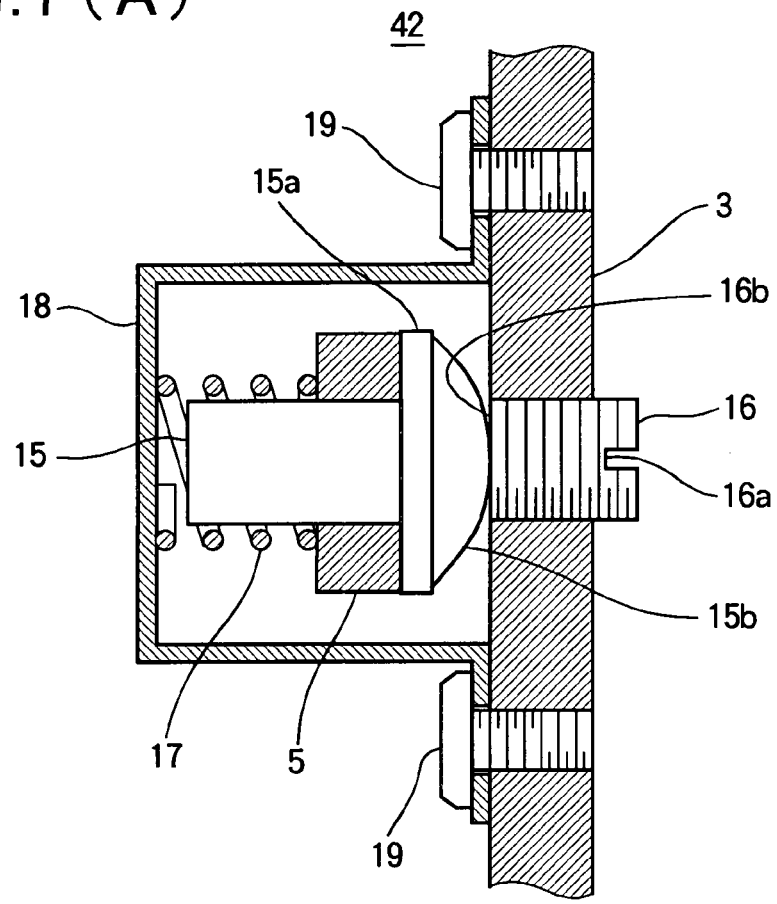
FIG. 7(A) is a longitudinal sectional view of a slide supporting portion according to Embodiment 1 of the present invention.

Hereinafter, Embodiment 1 of the present invention will be described with reference to the drawings. FIG. 1 is a perspective view of a supporting mechanism of a mirror (reflector) 1 according to Embodiment 1 of the present invention. FIG. 2 is a perspective view of a projector including a projection apparatus having the supporting mechanism of the mirror according to Embodiment 1. FIG. 3 is a perspective view of the mirror according to Embodiment 1. FIG. 4 is a side view of the mirror according to Embodiment 1. FIG. 5 is a side view showing the supporting mechanism of the mirror according to Embodiment 1 in an exploded manner. FIG. 6 is a cross-sectional view of a pivot supporting portion of the supporting mechanism of the mirror according to Embodiment 1. FIG. 7(A) is a longitudinal sectional view of a slide supporting portion of the supporting mechanism of the reflector according to Embodiment 1. In FIGS. 1 through 7, the same components are assigned the same reference numerals.

As shown in FIG. 2, the projector 1000 includes a projection apparatus composed of a projection optical system 100 and an illumination optical system 200, and a screen 300. The projection optical system 100 enlarges an image light (i.e., an irradiation light forming an image) emitted by the illumination optical system 200 using a projection lens 204, reflects the image light at a reflection surface 1a of a mirror 1, and projects the image light on the screen 300. To be more specific, the illumination optical system 200 includes a lamp 201 that emits a light, a lens 202 (whose structure is schematically illustrated in FIG. 2) that focuses the light emitted by the lamp 201, and an image display element 203 that spatially-modulates the light emitted by the lens 202. The image display element 203 is, for example, a liquid crystal display or DMD (Digital Micromirror Device), and is configured to convert the incident light into the image light (i.e., the irradiation light forming the image) by transmitting or reflecting the incident light. In an example shown in FIG. 2, a liquid crystal display is used as the image display device 203. The image light spatially-modulated by the image display device 203 is enlarged by the projection lens 204, reflected and enlarged by the mirror 1, and projected on the screen 300. The mirror 1 is supported by a fixing member 3 mounted to the base 2, as described later. In an example shown in FIG. 1, an optical axis 110 of the reflection surface 1a of the mirror 1 is aligned with an optical axis 210 of the projection lens 204.

In FIG. 1, the mirror (reflector) 1 having the reflection surface 1a is supported by the fixing member 3 via one pivot supporting portion 41 and two slide supporting portions 42 provided on the fixing member 3. As shown in FIG. 3, a first lug 4 is provided on the lower part of the mirror 1. Further, second lugs 5 are provided on bilaterally-symmetrical two positions on the upper part of the mirror 2. In this regard, "lug" means a protrusion provided on the periphery of the mirror 1 to support the mirror 1. The first lug 1 is supported by the pivot supporting portion 41, and the second lugs 5 are respectively supported by the slide supporting portions 42. As a result, the mirror 1 is supported at three positions in total on the fixing member 3.

In FIG. 3 showing the structure of the mirror 1, the mirror 1 has the reflection surface 1a that reflects the light, and peripheral portions 1b and 1c that surround the reflection surface 1a on both sides and on top of the reflection surface 1a. The reflection surface 1a of the mirror 1 has a rotational aspheric surface whose curvature changes in accordance with the distance in the radial direction from the center axis of the rotational aspheric surface. Therefore, the optical axis 110 of the reflection surface 1a of the mirror 1 is aligned with the above described center axis. Therefore, the portions on the mirror 1 of the same distance from the optical axis 110 have the same curvature. In the projection optical system 100, the mirror 1 reflects the light (toward the screen 300) at an area on the reflection surface 1a that does not include the optical axis 110. Further, the mirror 1 has the first lug 4 at the center of the lower part and two second lugs 5 at bilaterally-symmetrical two positions on the upper part, as described above. The respective lugs 4 and 5 have holes 4a and 5a into which intermediate members (described later) fit. An optical axis mark 6 is provided on the position (on the mirror 1) through which the optical axis 110 passes, which indicates the position (on the mirror 1) through which the optical axis 100 passes. The mirror 1 can be a formed of, for example, a molded material having a reflection surface, a molded resin or the like with a reflection surface formed thereon (using an aluminum sputtering film or the like), or the like.

By using the magnifying mirror having the rotational aspheric shape as the mirror 1, the magnifying power can be larger than the case in which only the projection lens 204 is used. Therefore, the distance from the projection lens 204 to the screen 300 can be shorter, so that the miniaturization of the projector 1000 can be accomplished.

Next, the relationship between the mirror 1 and the fixing member 3 will be described. FIG. 4 shows the light reflected by the mirror 1 (particularly, on the center line of the mirror 1 in the left-to-right direction) among the light emitted by the projection lens 204. A straight line (a center line) 123 is defined by connecting a lowermost point 121 and an uppermost point 122 of the area on the reflection surface 1a that reflects the light. The fixing member 3 has a supporting surface 3a that supports the mirror 1, and the supporting surface 3a is inclined almost parallel to the above described straight line 123.

The detail of the supporting mechanism of the mirror 1 will be described below. As shown in FIGS. 1 and 5, the mirror 1 is supported by the fixing member 3. An opening 7 (FIG. 1) is provided at the center of the supporting surface 3a of the fixing member 3, and is formed in the shape of the mirror 1 so that a part of the mirror 1 enters into the opening 7. Further, the fixing member 3 is fixed to the base 2 via fixing portions 8 and 9. Holes 8a and 9a are formed on the fixing portions 8 and 9, and fixed to the base 2 using not-shown fixing screws.

A dowel 2a is provided on the bottom of the base 2. This is used to determine the position of the supporting mechanism of the mirror 1 when the supporting mechanism of the mirror 1 is mounted in the projector 1000. In this regard, the base 2 can be considered as a part of the fixing member 3, and the base 2 is not a necessary component.

Here, a supporting mechanism of the pivot supporting portion 41 for supporting the first lug 4 provided on the lower part of the mirror 1 will be described. As shown in FIG. 5, in the pivot supporting portion 41, the first lug 4 is supported by a receiving portion 11 provided on the supporting surface 3a of the fixing member 3 via a pivot pin 10 as an intermediate member. The pivot pin 10 and the supporting surface 3a constitute a pivot mechanism. As shown in FIG. 6, the pivot pin 10 engages the first lug 4, and supports the first lug 4 by a flange 10a of the pivot pin 10. Further, an end portion 10b of the pivot pin 10 has a spherical surface, and contacts a receiving surface 11a of the receiving portion 11 in the form of a bowl. The first lug 4 is pushed to the fixing member 3 side by a spring 12, and therefore the end portion 10b of the pivot pin 10 is pushed against the receiving surface 11a of the receiving portion 11, so that the end portion 10b is not dropped out of the receiving portion 11. If the position of the end portion 10b is temporarily displaced due to the application of the external force, the end portion 10b soon returns to a stable original position since the receiving surface 11a is bowl-shaped.

Furthermore, the opposite side of the pivot pin 10 protrude from the first lug 4, and functions as a guide of the spring 12, so that the spring 12 is not largely displaced in the lateral direction. The spring 12 is held by a holding plate 13, and the holding plate 13 is fixed to the fixing member 3 by means of screws 14 at two positions. The holding plate 13 does not only hold the spring 12, but also prevents the end portion 10b of the pivot pin 10 from being dropped out of the receiving portion 11. As described above, the first lug 4 on the lower part of the mirror 1 is supported by the fixing member 3 by means of the pivot mechanism, the mirror 1 is able to freely rotate about a pivoting point (as a fulcrum) which is a rotation center of the pivot mechanism. In order to enhance the rotation characteristics of the pivot mechanism, it is possible to lubricate (with lubricant or the like) a contact portion between the end portion 10b of the pivot pin 10 and the receiving surface 11a of the receiving portion 11.

Next, a supporting mechanism of the slide supporting portions 42 for supporting the second lugs 5 provided on the right and left two positions on the upper part of the mirror 1 will be described. In each slide supporting portion 42, as shown in FIG. 5, the second lug 5 is supported by the fixing member 3 via a contact pin 15 as an intermediate member. Further, the height of the contact portion between the contact pin 15 and the fixing member 3 is adjustable using an adjusting screw 16 (adjusting mechanism) provided on the fixing member 3. As shown in FIG. 7(A), the contact pin 15 engages the second lug 5, and supports the second lug 5 by a flange 15a. An end portion 15b of the contact pin 15 has the spherical shape, and contacts an end portion 16b of the adjusting screw 16 provided in opposition to the end portion 15b. The end portion 16b of the adjusting screw 16 is a flat surface, and therefore contacts the end portion 15b of the contact pin 15 in point-to-surface contact. In this regard, although the end portion 15b of the contact pin 15 is the spherical surface, the end portion 15b of the contact pin 15 is not necessarily the spherical surface, but it is only necessary that the end portion 15b of the contact pin 15 is able to contact the end portion 16b of the adjusting screw 16 to ensure sufficient sliding characteristics. A stress is concentrated on the contact portion where the end portion 15b of the contact pin 15 and the end portion 16b of the adjusting screw 16 contact each other, and therefore it is also possible to relax the stress by increasing the radius of curvature of the end portion 15b of the contact pin 15. In this case, it is possible to lubricate (with lubricant or the like) the end portion 15b of the contact pin 15 and the end portion 16b of the adjusting screw 16 so as to ensure the sliding characteristics therebetween.

The adjusting screw 16 engages a threaded hole provided on the fixing portion 3. Further, a groove 16a is formed on the other end of the adjusting screw 16, into which a tip of a tool such as a driver can be inserted, so that the adjusting screw 16 can be rotated from the backside of the fixing member 3 using the tool. By rotating the adjusting screw 16, the height (protruding amount of the adjusting screw 16 from the threaded hole) can be adjusted. The second lug 5 is pushed to the fixing member 3 side by a spring 17 (a pushing member), and the end portion 15b of the contact pin 15 is pushed against the adjusting screw 16, by which the second lug 5 is supported, and the second lug 15 is movable in a plane of a contact portion between the end portion 15b and the adjusting screw 16. In this regard, the area of the end portion 16b of the adjusting screw 16 is made larger than the movable range of the contact pin 15, so that the contact pin 15 is not dropped out thereof. The spring 17 is guided by the contact pin 15, and is held by a holding plate 18. The holding plate 18 is fixed to the fixing member 3 by screws 19 at two positions.

Furthermore, the distances (gaps) from the supporting surface 3a of the fixing member 3 to the first lug 4 and to the second lug 5 are set as short as possible, and those gaps are the same as each other, so that the influence of the temperature on the expansion and contraction is restricted. Materials of the intermediate members such as the pivot pin 10 and the contact pins 15 are the same as each other, so that the angle of the reflection surface 1a with respect to the optical axis 110 of the mirror 1 does not change even when the gaps change. In Embodiment 1 of the present invention, the distance (gap) from the supporting surface 3a of the fixing member 3 to the back surface of the first lug 4 of the mirror 1 is the same as the distance (gap) from the supporting surface 3a of the fixing member 3 to the back surface of the second lug 5. The material of the fixing member 3 is an aluminum or stainless having a higher hardness and a smaller linear expansion coefficient than the mirror 1. The materials of the pivot pin 10, the receiving portion 11, the contact pins 15 and the adjusting screws 16 are metal such as aluminum or stainless (i.e., the material having higher hardness and a smaller linear expansion coefficient than the mirror 1). In this regard, the receiving portion 11 can be formed integrally with the fixing member 3, or can be formed as an individual member.

With the above described configuration of Embodiment 1 of the present invention, when the temperature, humidity or the like changes, the mirror 1 expands and contracts about the center position, i.e., the first lug 4 on the lower part of the mirror 1 supported by the pivot mechanism. In this state, the contact pins 15 respectively engaging the second lugs 5 provided on two position on the upper part of the mirror 1 freely move along the end portions 16b of the adjusting screws 16 provided on the fixing member 3. Therefore, the upper part of the mirror 1 (supported by the second lugs 5) is not applied with a force preventing the expansion and contraction of the mirror 1, with the result that the deformation of the mirror 1 can be minimized. Further, even when the mirror 1 is deformed due to some sort of action, the position of the first lug 4 of the mirror 1 is determined and supported by the receiving portion 11 provided at a predetermined position on the fixing member 3 by the pivot supporting portion 41, and therefore does not move. Further, the mirror 1 is also supported by the slide supporting portions 42 provided on two positions on the upper part of the mirror 1, and therefore the mirror 1 is supported by three positions in total. Accordingly, the mirror 1 is stably supported without causing an end thereof to be floated. Thus, even when the mirror 1 largely expands and contracts due to the change in temperature, humidity or the like, the distortion of the image can be minimized.

Further, the supporting surface 3a of the fixing member 3 is provided along the surface of the mirror 1, and therefore, even when the mirror 1 expands and contracts due to the change in temperature, humidity or the like, the mirror 1 is supported along the direction of the expansion and contraction. Therefore, the change in orientation of the mirror 1 can be minimized, and the image does not largely move.

Further, even when the mirror 1 rotates about the pivoting point (fulcrum) due to the positioning error generated when the mirror 1 is mounted to the predetermined position on the fixing member 3 or due to the deformation of the component such as the mirror 1 caused by the change in temperature, humidity or the like, the angle of the light reflected by the mirror 1 is less likely to change. This is because the shape of the reflection surface 1a of the mirror 1 is rotationally-symmetrical about the optical axis 110 of the mirror 1, and because the pivoting point is provided in the vicinity of the optical axis 110. Accordingly, the image projected on the screen 300 by the projection optical system 100 is not largely deformed. In this regard, as can be understood from FIGS. 4 and 5, the position of the pivoting point is provided in the vicinity of the optical axis 110. If it is desired to further restrict the change in direction of the light reflected by the mirror 1, it is only necessary to dispose the position of the pivoting point on the optical axis 110 of the mirror 1. In this case, the direction of the light reflected by the mirror 1 hardly changes, and the projection image is not deformed.

Furthermore, with regard to the pushing of the first lug 4 and the second lugs 5 of the mirror 1 against the fixing member 3, the first lug 4 and the second lugs 5 do not directly contact the fixing member 3, and therefore the deformation of the first lug 4 and the second lugs 5 hardly occur even when some sort of action is applied from the fixing member 3. Therefore, the reliability is high. Further, if the pivot pin 10 and the contact pins 15 as the intermediate members are deformed due to the abrasion or the like, these components can be replaced, and therefore it is cost efficient.

Further, the distance from the supporting surface 3a of the fixing member 3 to the back surface of the first lug 4 and the distances from the supporting surface 3a of the fixing member 3 to the back surfaces of the second lugs 5 are the same as each other, and the materials of the pivot pin 10 and the contact pins 15 are the same as each other. Therefore, even when the pivot pin 10 and the contact pins 15 expand and contract due to the change in temperature, the distances from the fixing member 3 to the first lug 4 and to the second lugs 5 change in a similar manner in synchronization with the expansion and contraction, and therefore the angle of the supported mirror 1 with respect to the fixing member 3 does not change.

Additionally, the material (such as aluminum, stainless or the like) having a higher hardness and a smaller linear expansion coefficient than the mirror 1 is used as at least one of the fixing member 3, the pivot supporting portion 41 and the slide supporting portions 42. Therefore, even when the temperature changes, the amounts of expansion and contraction of respective parts are small compared with the mirror 1, so that the position and the orientation (angle) of the mirror 1 with respect to the fixing member 3 are not influenced. Further, the pivot pin 10, the receiving portion 11 of the fixing member 3, the contact pins 15 of the slide supporting portions 42 and the adjusting screws 16 do not wear by sliding (associated with the expansion and contraction of the mirror 1) to cause the deterioration of the movement and the inability of the accurate positioning.

Further, even if the positioning accuracies of the first lug 4 and the second lugs 5 of the mirror 1 are low, and even if the flatness of the supporting surface 3a of the fixing member 3 is low, the mirror 1 freely rotates about the end portion 10b of the pivot pin 10 provided on the pivot supporting portion 41, so that the mirror 1 is supported without backlash. Further, even if the orientation of the mirror 1 deviates from the normal position, the orientation of the mirror 1 can be adjusted using the two adjusting screws 16 engaging the two positions on the upper part of the fixing member 3, and therefore the mirror 1 can be positioned with high accuracy irrespective of the accuracy of the components. Additionally, the adjusting mechanism formed integrally with the slide supporting portions 42 is employed, and therefore it becomes unnecessary to provide a multi-axial independent adjusting mechanism having been provided in the conventional supporting mechanism for adjusting the orientation (angle) of the mirror 1. Therefore, it becomes possible to reduce the cost and weight by reducing the number of parts.

In Embodiment 1 of the present invention, the base material of the mirror 1 is a molded component of resin or the like in consideration of the mass-productivity and the reduction in weight. However, if it is desired to further restrict the amount of deformation of the reflection surface 1a caused by the deformation of the base material over time (after the molding) and caused by the change in temperature, humidity or the like, it is also possible to use a machined component of a metal such as aluminum or the like. The fixing member 3 has been expressed as metal. However, if it is desired to reduce the weight with a high priority, it is possible to use any light weight material such as plastic, wood, magnesium alloy or the like when the strength, accuracy and temperature properties are satisfied.

The projector 1000 shown in FIG. 2 employs the supporting mechanism of the mirror 1 according to Embodiment 1 of the present invention, and therefore the mirror 1 can be optimally supported on the fixing member 3 and the orientation of the mirror 1 can be adjusted in a simple manner. Furthermore, since the reflection surface 1a of the mirror 1 is not distorted by the change in temperature, humidity or the like, the optical axis 210 of the projection lens 204 of the projection optical system 100 can be disposed in an optimum relationship with the optical axis 110 of the mirror 1, and the disposition can be constantly kept irrespective of the change in temperature, humidity or the like. As a result, in the projector 1000, a large displacement or deformation does not occur in the image projected on the screen 300.

In this regard, in Embodiment 1 of the present invention, the description has been made to the case in which the supporting mechanism of the mirror 1 is mounted on the projector 1000 composed of the projection optical system 100 and the illumination optical system 200. However, it goes without saying that the supporting mechanism of the mirror 1 can be used in other optical apparatus. For example, the supporting mechanism of the mirror 1 can be used in a scanner apparatus for reading an image, an exposing apparatus or a stepper apparatus used in a semiconductor manufacturing process. This is the same in the following respective embodiments.

Embodiment 2

Figure 7B:
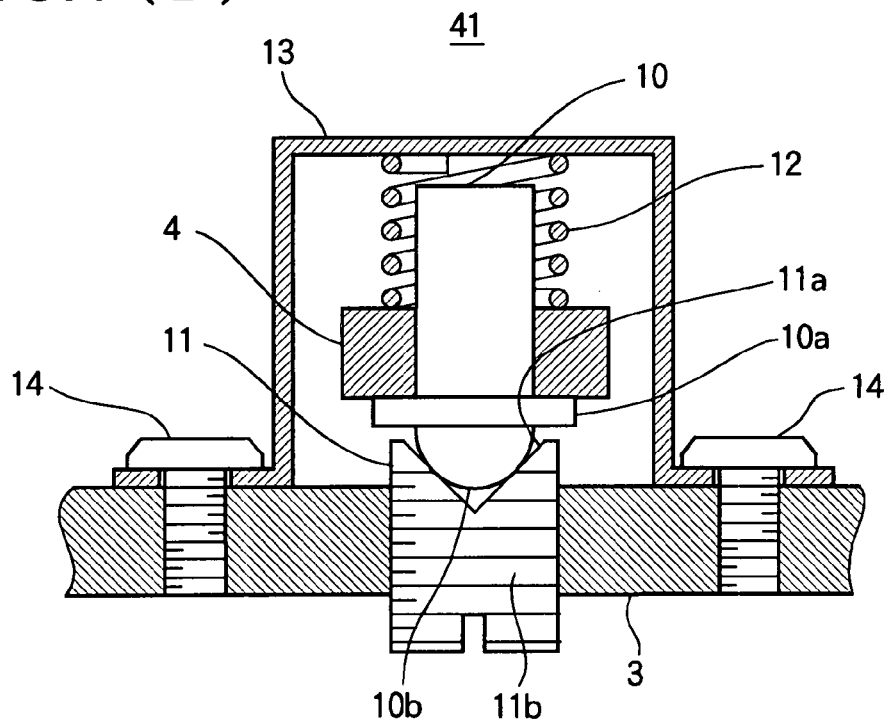
FIG. 7(B) is a cross-sectional view of a pivot supporting portion according to Embodiment 2 of the present invention.

In the above described Embodiment 1, as was described with reference to FIG. 7(A), the slide supporting portion 42 is provided with the adjusting mechanism for adjusting the supporting position of the mirror (i.e., the reflector) 1. More specifically, the adjusting screw 16 is constructed by the member having the end portion 16b contacting the end portion 15b of the contact pin 15, and the adjusting screw 16 engages the fixing member 3, so that the supporting position of the mirror 1 can be adjusted by rotating the adjusting screw 16. In this Embodiment, the same adjusting mechanism is provided on the pivot supporting portion 41, so as to obtain the same advantage. More specifically, as shown in FIG. 7(B), an adjusting screw 11b (which is the same as the above described adjusting screw 16) constitutes the receiving portion 11 having a bowl-shaped receiving surface 11a contacting the end portion 10b of the pivot pin 10, and the adjusting screw 11b engages the threaded hole of the fixing member 3. With such a configuration, by rotating the adjusting screw 11b, the contact position of the end portion 10b of the pivot pin 10 and the receiving surface 11a of the receiving portion 11 can be adjusted. As a result, the supporting position of the mirror 1 as the reflector can be adjusted. That is, the adjusting mechanism for adjusting the supporting position of the mirror 1 (as the reflector) enables the same adjustment, irrespective of whether the adjusting mechanism is provided on the slide supporting portions 42 or the pivot supporting portion 41. If the adjusting mechanism is provided on both of the slide supporting portions 42 and the pivot supporting portion 41, it becomes possible to perform an adjustment with greater flexibility. The configuration according to this Embodiment can be applied to the respective Embodiments as described below.

Embodiment 3

Figure 8:
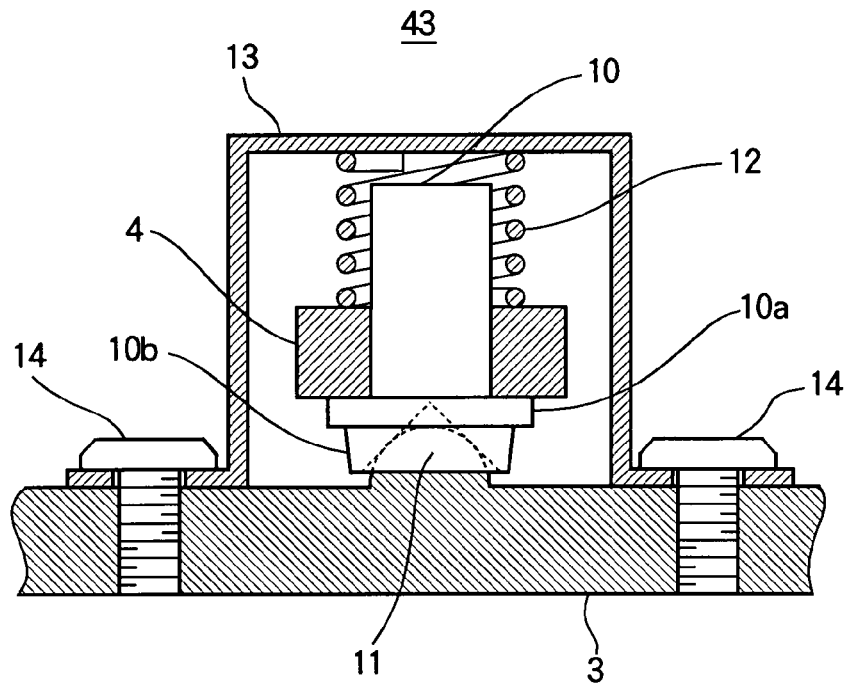
FIG. 8 is a cross-sectional view of a pivot supporting portion of a supporting mechanism of a mirror according to Embodiment 3 of the present invention.
Figure 9:
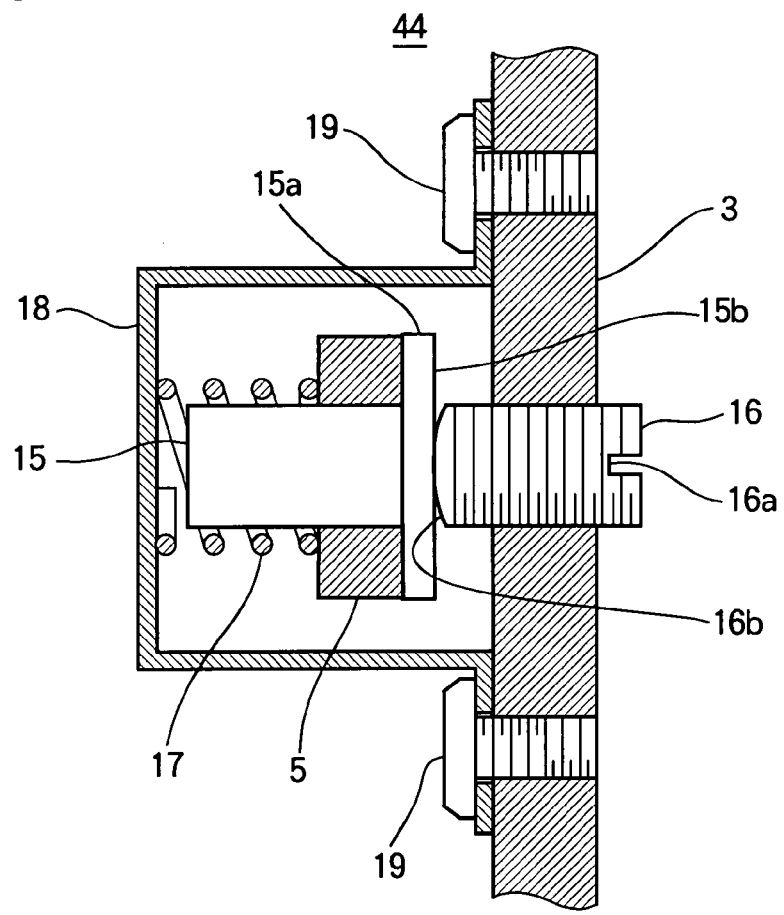
FIG. 9 is a longitudinal sectional view of a slide supporting portion of the supporting mechanism of the mirror according to Embodiment 3 of the present invention.

Hereinafter, Embodiment 3 of the present invention will be described with reference to drawings. FIG. 8 is a cross-sectional view cut in the horizontal direction and as seen from below, showing a supporting mechanism of a pivot supporting portion 43 supporting the first lug 4 in this Embodiment. The supporting mechanism of the pivot supporting portion 43 has the configuration that differs from the supporting mechanism of the pivot supporting portion 41 (FIG. 6) described in Embodiment 1. FIG. 9 is a longitudinal sectional view cut in the horizontal direction and as seen from the side, showing a supporting mechanism of the slide supporting portions 42. The supporting mechanism of the slide supporting portions 42 has the configuration that differs from the supporting mechanism of the slide supporting portions 42 (FIG. 7) described in Embodiment 1. In respective parts shown in FIGS. 8 and 9, respective portions that are the same as or corresponding to the portions shown in FIGS. 6 and 7 are assigned the same reference numerals.

In the supporting mechanism of the mirror 1 according to Embodiment 3 of the present invention, with respect to the supporting mechanisms supporting the first lug 4 and the second lugs 5 of Embodiment 1, the shapes of the contact portions between the supported sides and the supporting sides are interchanged with each other. That is, the shape of the end portion of the intermediate member of the supporting portion of the mirror 1 and the shape of the contact portion of the fixing member 3 contacting the end portion are interchanged with each other, without changing the configuration for supporting. The configuration is the same as that of Embodiment 1 in other respect.

As shown in FIG. 8, in the supporting mechanism of the pivot supporting portion 43 for supporting the first lug 4 on the lower part of the mirror 1, the end portion 10b of the pivot pin 10 is bowl-shaped. In contrast, the shape of the receiving portion 11 provided on the fixing member 3 and contacting the end portion 10b has a spherical surface. When such a structure is employed, the configuration for supporting the mirror 1 using the pivot mechanism is not changed, and the mirror 1 freely rotates about the pivoting point.

As shown in FIG. 9, in the supporting mechanism of the slide supporting portions 44 for supporting the second lugs 5 at two positions on the upper part of the mirror 1, the end surfaces 15b of the flanges 15a of the contact pins 15 are flat surfaces. In contrast, the end portions 16b of the adjusting screws 16 contacting the end surfaces 15b have spherical surfaces. Therefore, at two positions on the upper part of the mirror 1, the mirror 1 is supported at points as in Embodiment 1, and the configuration in which the mirror 1 is supported at three positions (including the pivoting point) is not changed. Further, the orientation of the mirror 1 can be adjusted by rotating the adjusting screws 16. In this regard, although the end portions 16b of the adjusting screws 16 are spherical surfaces, the spherical surfaces are not essential, but it is only necessary that the end portions 16b contact the end surfaces 15b of the contact pins 15 to ensure sufficient sliding characteristics.

The act of the supporting mechanism when temperature, humidity or the like changes is not largely different from Embodiment 1. The portion on the mirror 1 that does not change its position with respect to the fixing member 3 is the first lug 4 supported by the pivot supporting portion 43, and the mirror 1 expands and contracts about the position of the first lug 4. In contrast, the positions of the second lugs 5 on the upper part of the mirror 1 move in the direction of expansion-contraction about the first lug 4, since the contact pins 15 of the slide supporting portions 44 move in contact with the end portions 16b of the adjusting screws 16. With such a configuration, the mirror 1 is slidably movable at the slide supporting portions 44, and therefore the stress associated with the expansion and contraction between the first lug 4 and the second lugs 5 is not generated, so that the unnecessary deformation associated with the stress relief does not occur. In this regard, the mirror rotates about the pivoting point of the pivot supporting portion 43 in accordance with the expansion and contraction of the mirror 1, and is kept supported at three positions, with the result that the mirror 1 can be supported in the stable orientation.

As configured above, according to Embodiment 3 of the present invention, the same advantage as Embodiment 1 can be obtained. Further, the first lug 4 and the second lugs 5 of the mirror 1 are supported by the fixing member 3 by means of the intermediate members such as the pivot pin 10 of the pivot supporting portion 43 and the contact pins 15 of the slide supporting portions 44. Therefore, the shapes of the supporting portions can be selected in accordance with the various conditions by replacing the intermediate members as in Embodiment 1. Further, the replacement of the members can be easily performed, and therefore it becomes easy to examine the shapes and the materials at the experimental stage.

Embodiment 4

Figure 10:
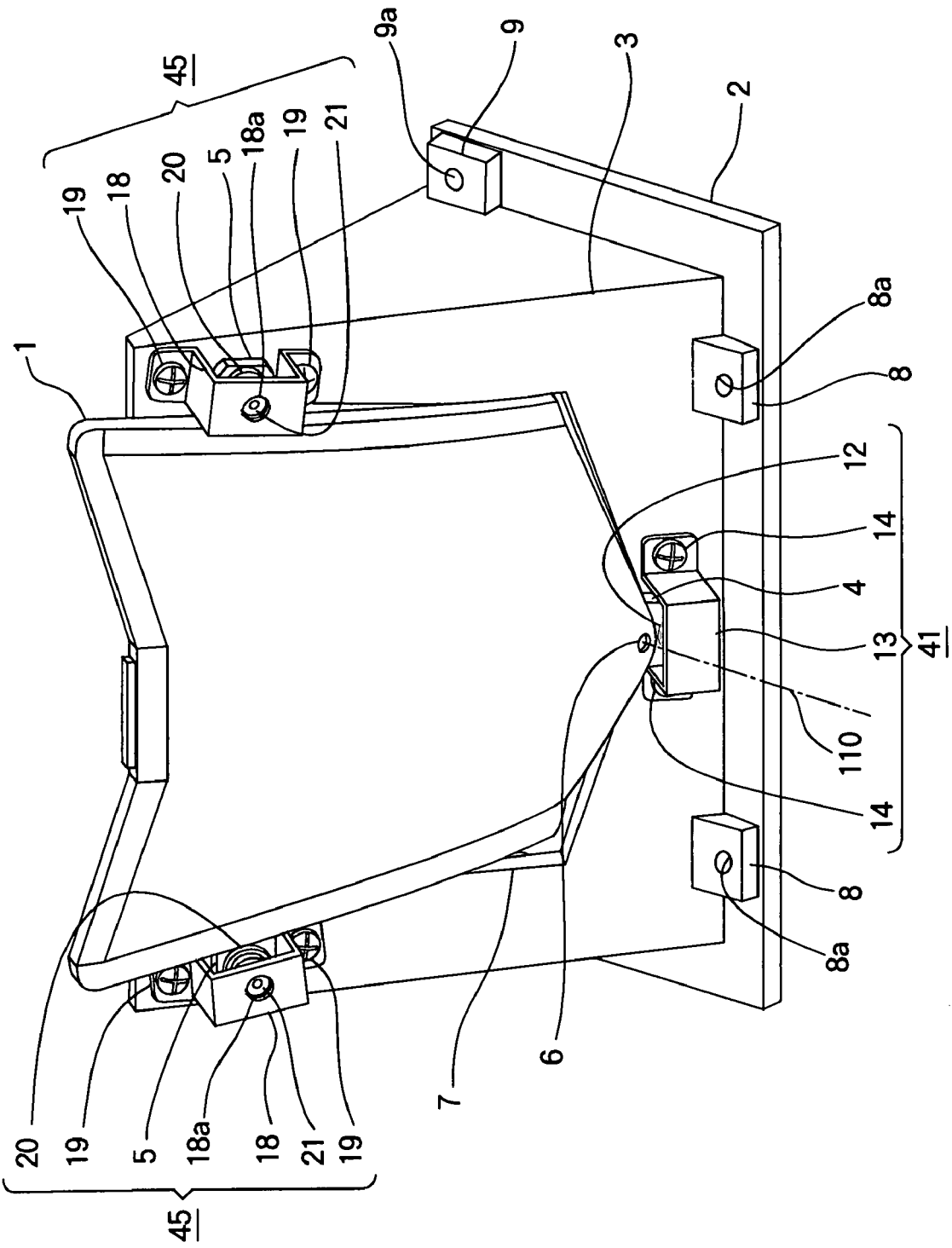
FIG. 10 is a perspective view of a supporting mechanism of a mirror according to Embodiment 4 of the present invention.
Figure 11:
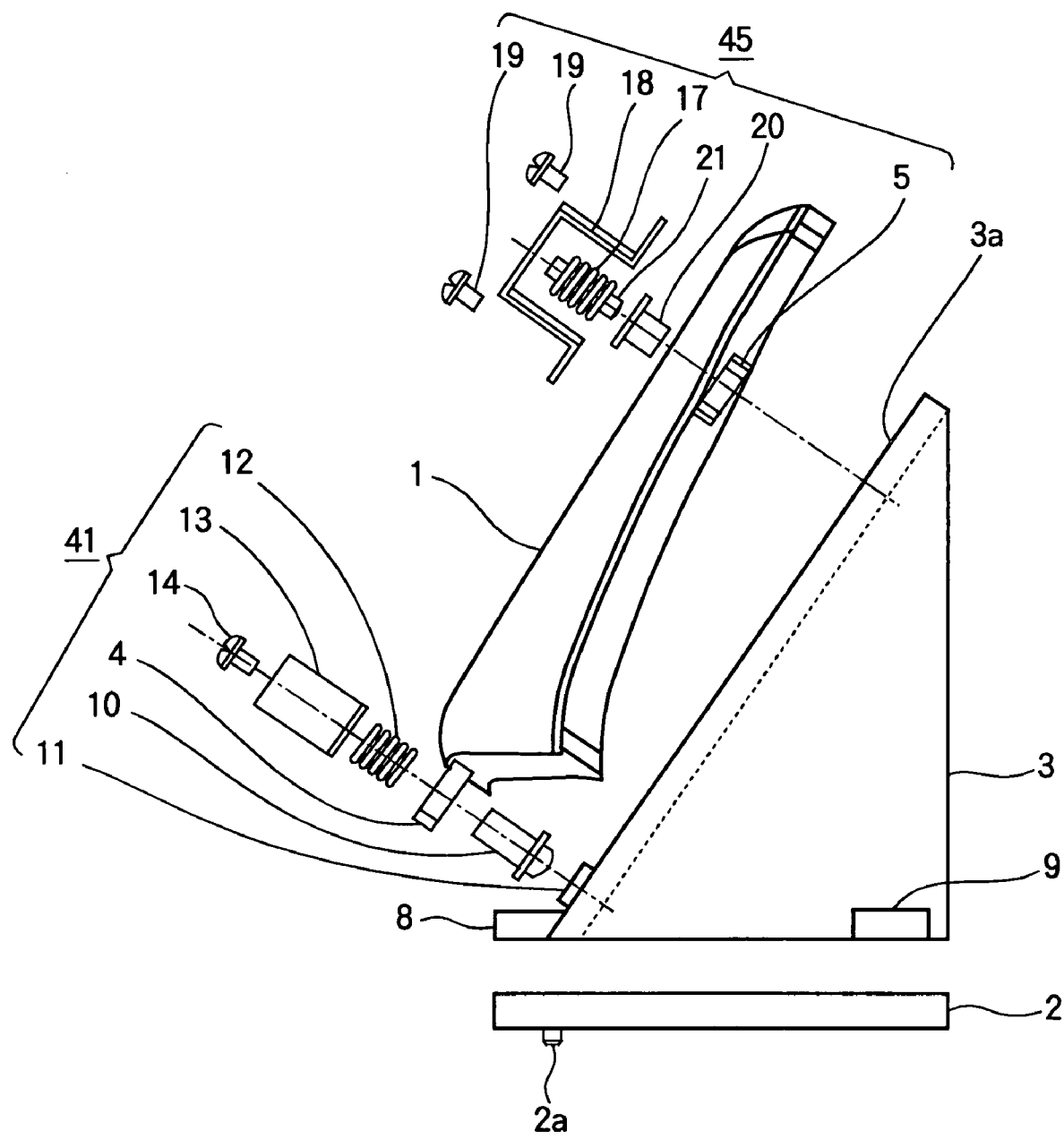
FIG. 11 is a side view showing the supporting mechanism of the mirror according to Embodiment 4 of the present invention in an exploded manner.
Figure 12:
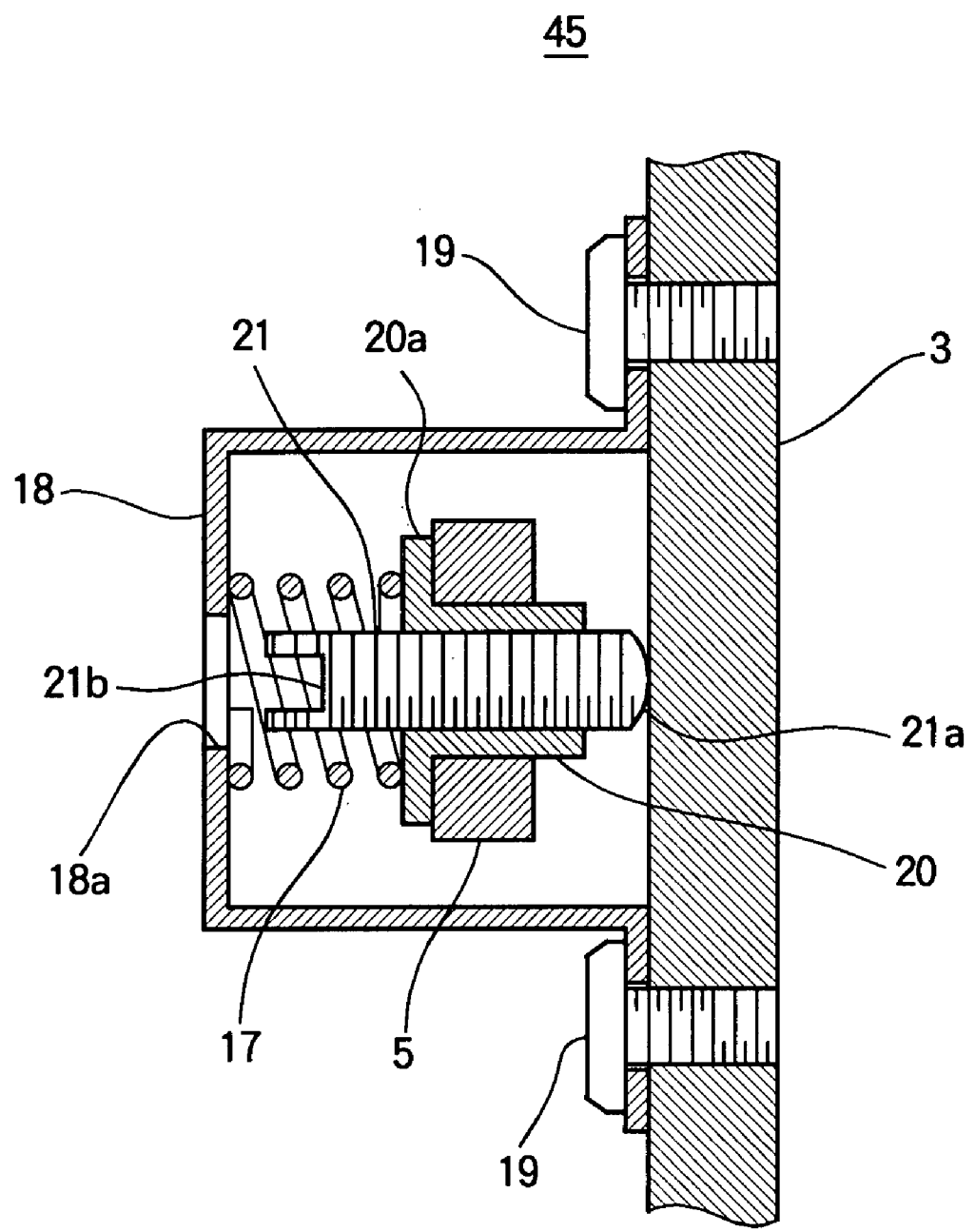
FIG. 12 is a longitudinal sectional view of a slide supporting portion of the supporting mechanism of the mirror according to Embodiment 4 of the present invention.

Hereinafter, Embodiment 4 of the present invention will be described with reference to drawings. FIG. 10 is a perspective view showing a supporting mechanism of the mirror 1 according to Embodiment 4 of the present invention. FIG. 11 is a side view showing the supporting mechanism of the mirror 1 in an exploded manner. FIG. 12 is a longitudinal sectional view cut in the longitudinal direction and as seen from the side, showing the supporting mechanism of the slide supporting portion 45 that supports the second lug on the upper part of the mirror 1. In this regard, the supporting mechanism of the pivot supporting portion 41 supporting the first lug 4 on the lower part of the mirror 1 is the same as the supporting mechanism (FIG. 6) in Embodiment 1. In respective parts shown in FIG. 10 through 12, portions that are the same as or corresponding to the respective portions shown in FIGS. 2, 5 and 7 are assigned the same reference numerals.

The supporting mechanism of the mirror 1 according to Embodiment 4 of the present invention is different from the supporting mechanism of the mirror 1 according to the above described Embodiment 1 in the structure of the slide supporting portions for supporting the second lugs 5 on the upper part of the mirror 1. In the above described Embodiment 1, the adjusting screws 16 engaging the threaded holes of the fixing member 3 are operated from the backside of fixing member 3 in order to adjust the height of the second lugs 5. In contrast, in this Embodiment 4, the adjusting screws 16 are operated from the front side of the second lugs 5 of the mirror 1.

In FIG. 10, the first lug 4 on the lower part of the mirror 1 is rotatably supported by the pivot mechanism. The second lugs 5 at two positions on the upper part of the mirror 1 contact the fixing member 3 by means of the intermediate members in point-to-surface contact. The employment of the configuration for supporting the mirror 1 at three positions is the same as Embodiment.

In the supporting mechanism of the slide supporting portions 45 supporting the second lugs 5 on the upper part of the mirror 1, as shown in FIG. 11, bushes 20 engage the holes 5a (see FIG. 3) provided on the second lugs 5, and adjusting pins 21 are fitted in the bushes 20. The second lugs 5 and the bushes 20 can be adhered to each other so as not to be disengaged from each other. The springs 17 guided by the adjusting pins 21 contact flanges 20a of the bushes 20, and held by the holding plates 18, so as to generate the pushing force.

In the longitudinal sectional view shown in FIG. 12, the end portion 21a of the adjusting pin 21 has a spherical surface, and contacts the fixing member 3 in point-to-surface contact. An inner surface of the bush 20 and a side surface (an outer surface) of the adjusting pin 21 are threaded. The height of the second lug 5 can be adjusted by rotating an adjusting hexagonal hole 21b provided on the opposite end of the adjusting pin 21 using a hexagonal wrench (not shown) or the like. As shown in FIGS. 10 and 12, an adjusting hole 18a is formed on the head portion of the holding plate 18 for inserting the hexagonal wrench. When the adjusting pin 21 is operated, the height of the second lug 5 can be adjusted from the front side of the mirror 1 by inserting the hexagonal wrench through the adjusting hole 18a.

The materials of the respective members assigned the same numerals are the same as those of Embodiment 1 of the present invention. The bushes 20 and the adjusting pins 21 can be made of metal such as aluminum, stainless, diecast or magnesium alloy of the like, or plastic.

Embodiment 4 of the present invention is configured as above, and therefore the same advantage as Embodiment 1 can be obtained. In addition, when the adjustment of the supporting mechanism on the upper part of the mirror 1 is performed, the adjustment can be performed from the front side of the mirror 1. Therefore, it is not necessary to put a tool behind the fixing member 3 to rotate the screw. As a result, the adjustment becomes easy, and the time for the adjustment can be shorten. Further, the springs 17 do not directly push the second lugs 5, but push the flanges 20a of the bushes 20. Therefore, the flanges 20a contact the second lugs 5 in point-to-surface contact, so that the second lugs 5 are not deformed nor damaged, even when the material of the mirror 1 is resin.

Embodiment 5

Figure 13:
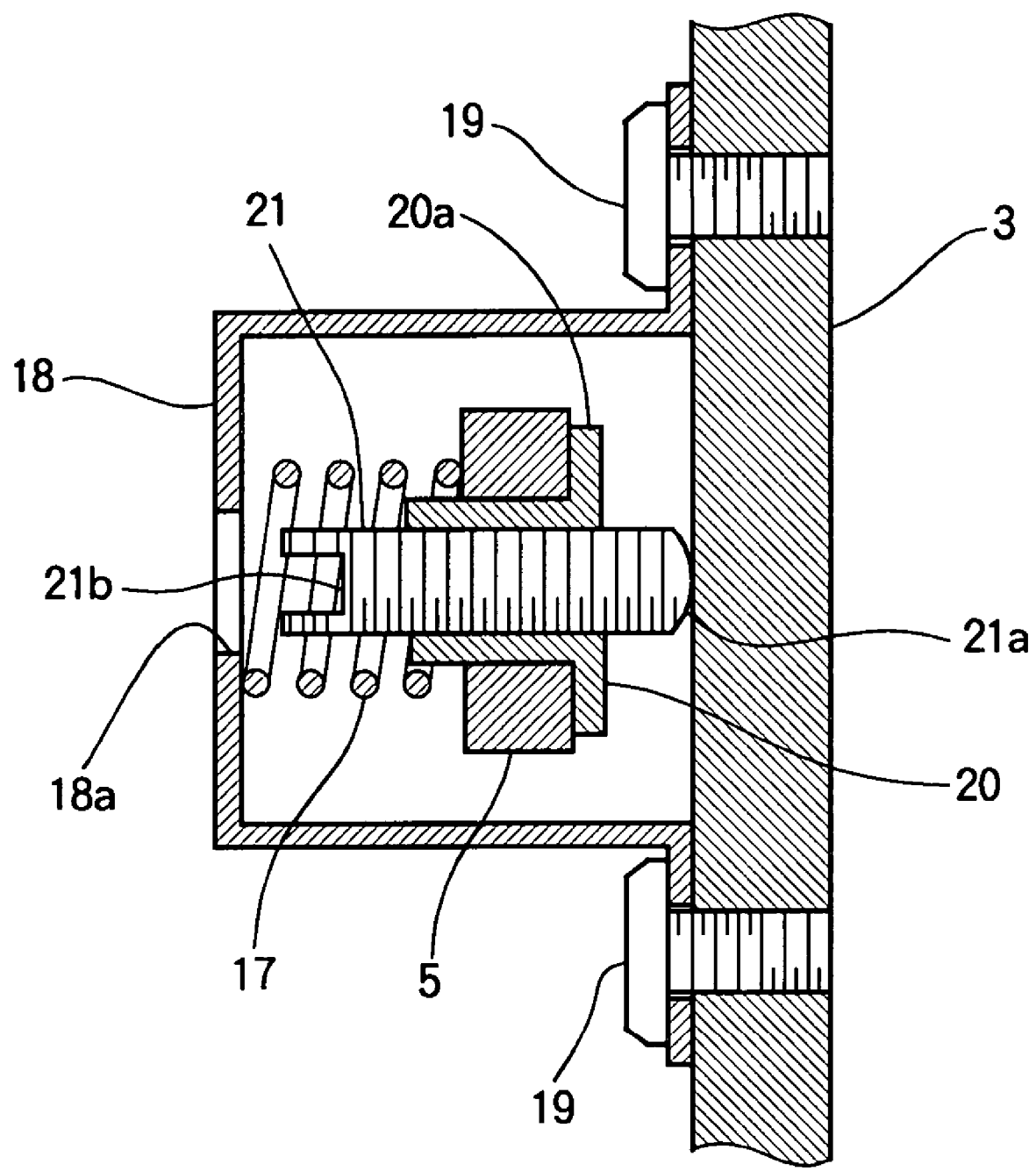
FIG. 13 is a longitudinal sectional view of a slide supporting portion of a supporting mechanism of a mirror according to Embodiment 5 of the present invention.

Hereinafter, Embodiment 5 of the present invention will be described with reference to a drawing. FIG. 13 is a longitudinal sectional view cut in the longitudinal direction and as seen from the side, showing a supporting mechanism for supporting the second lugs 5 on the upper part of the mirror 1. In the respective parts of FIG. 13, portions that are the same as or corresponding to the respective portions shown in FIG. 12 are assigned the same reference numerals.

The supporting mechanism of the mirror 1 according to Embodiment 5 of the present invention is different from the supporting mechanism of the mirror 1 according to Embodiment 4 of the present invention in that the inserting direction of the bushes 20 with respect to the second lugs 5 is changed, and the other configuration is the same. As can be understood from the comparison of the slide supporting portion 45 of FIG. 12 with the slide supporting portion 46 of FIG. 13, the springs 17 directly push the second lugs 5, and the flanges 20a of the bushes 20 receive the second lugs 5 in Embodiment 5 of the present invention. With such a configuration, the second lugs 5 are not dropped out of the bushes 20, and there is an advantage that the press-fitting or bonding of the bushes 20 to the second lugs 5 becomes unnecessary.

Embodiment 6

Figure 14:
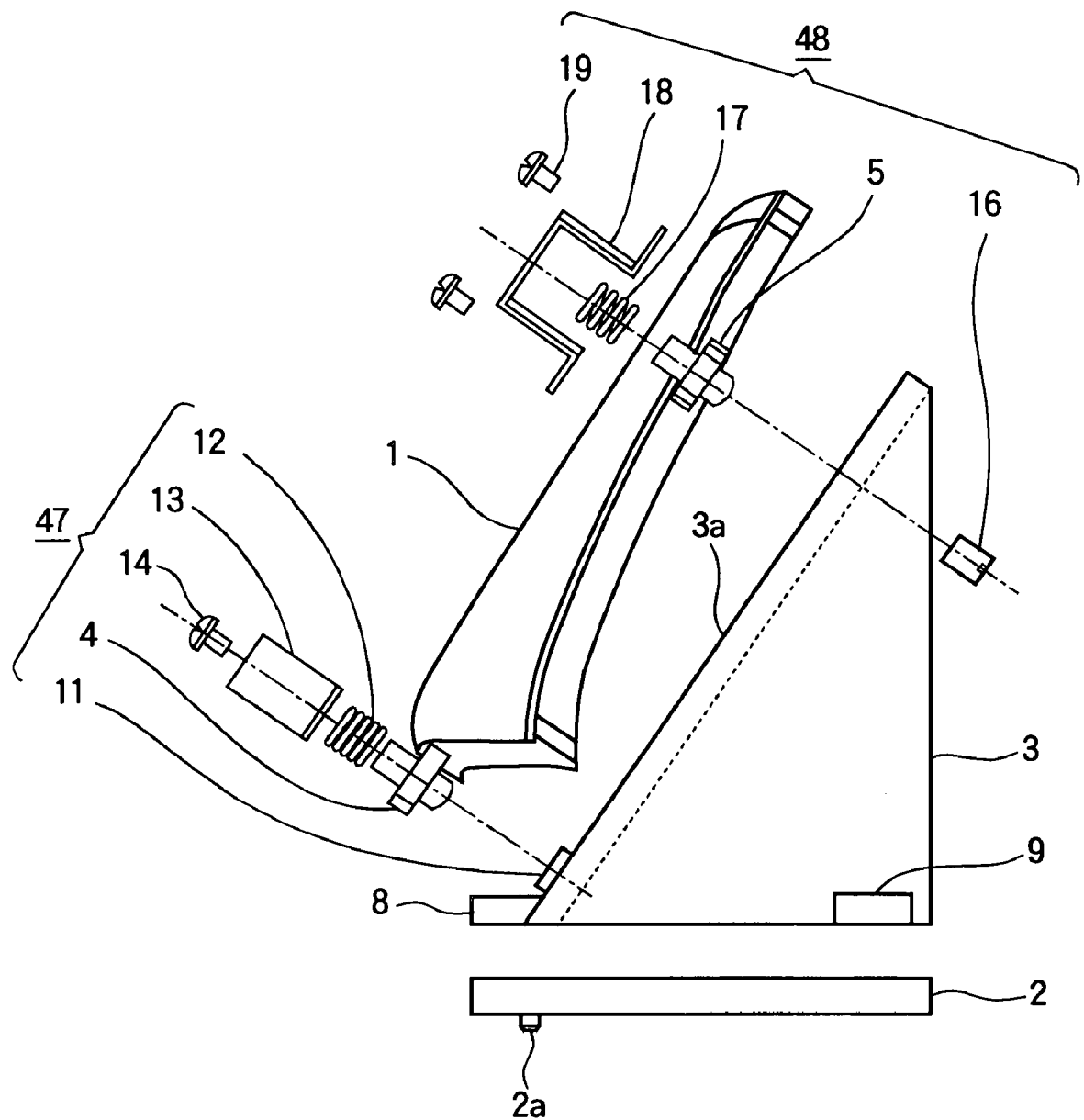
FIG. 14 is a side view showing a supporting mechanism of a mirror according to Embodiment 6 of the present invention in an exploded manner.
Figure 15:
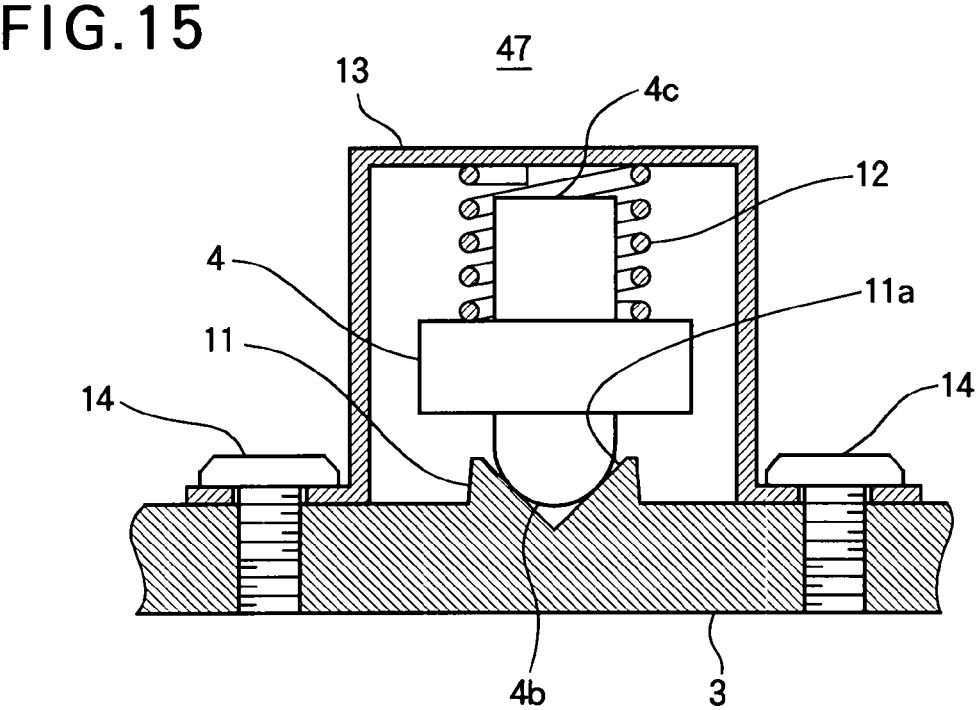
FIG. 15 is a cross-sectional view of a pivot supporting portion of a supporting mechanism of a mirror according to Embodiment 6 of the present invention.
Figure 16:
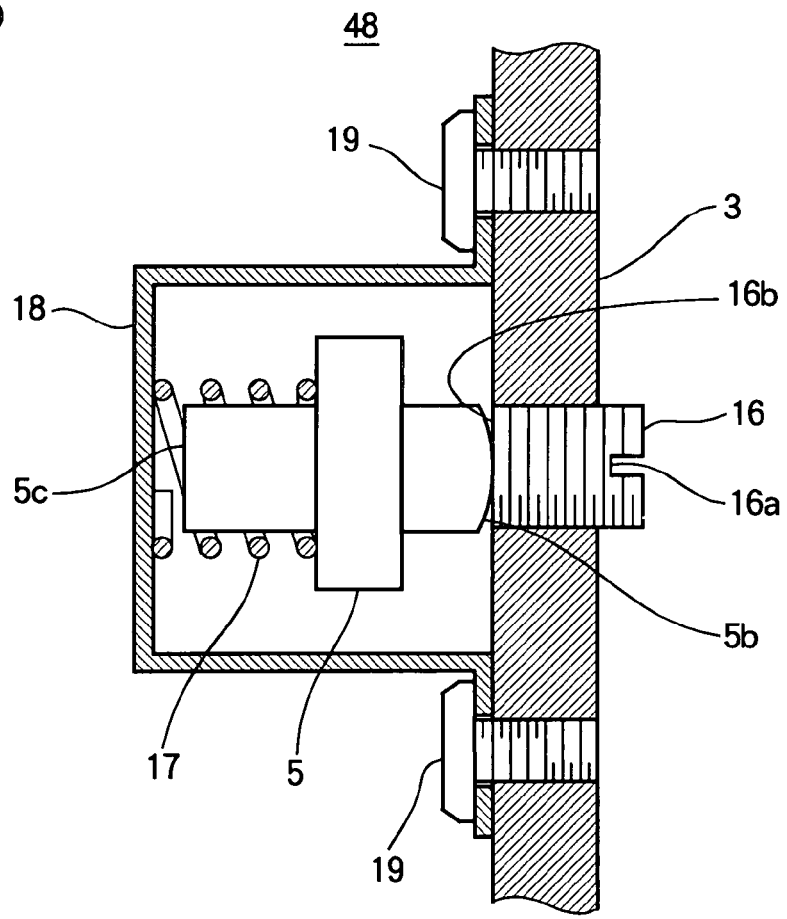
FIG. 16 is a longitudinal sectional view of a slide supporting portion of the supporting mechanism of the mirror according to Embodiment 6 of the present invention.

Hereinafter, Embodiment 6 of the present invention will be described with reference to drawings. FIG. 14 is a side view showing a supporting mechanism of the mirror 1 according to Embodiment 6 of the present invention in an exploded manner. FIG. 15 is a cross-sectional view cut in the lateral direction and as seen from below, showing a supporting mechanism of a pivot supporting portion 47 that supports the first lug 4 on the lower part of the mirror 1. FIG. 16 is a longitudinal sectional view cut in the longitudinal direction and as seen from the side, showing a supporting mechanism of a slide supporting portion 48 for supporting the second lugs 5 on the upper part of the mirror 1. The components that are the same as or corresponding to the components described in Embodiment 1 are assigned the same reference numerals, and description thereof will be omitted. In respective parts shown in FIGS. 14 through 16, portions that are the same as the respective portions shown in FIGS. 5 through 7 are assigned the same reference numerals.

As shown in FIG. 14, Embodiment 6 of the present invention does not use the intermediate members described in the previous embodiments, but contact portions are formed on the first lug 4 and the second lugs 5 of the mirror 1. The contact portions function as intermediate members, and directly contact the fixing member 3. In the supporting mechanism of the pivot supporting portion 47 that supports the first lug 4 on the lower part of the mirror 1 shown in FIG. 15, the first lug 4 protrudes toward the fixing member 3 side, and an end portion 4b has a spherical surface. The end portion 4b of the first lug 4 is pivotally supported by the receiving surface 11a of the receiving portion 11 formed on the fixing member 3. The first lug 4 also protrudes toward the side opposite to the end portion 4b, and functions as a guide portion 4c that determines the position of the spring 12 and prevents the dropping of the spring 12.

In contrast, in the supporting mechanisms of the slide supporting portions 48 that support the second lugs 5 at the upper part of the mirror 1 shown in FIG. 16, end portions 5b protrude from the second lugs 5 toward the fixing member 3 side and contact the adjusting screws 16 provided on the fixing member 3. The end portions 5b have spherical surfaces and contact the end portions 16b (flat surfaces) of the adjusting screws 16 in point-to-surface contact. The second lugs 5 protrude toward the side opposite to the end portions 5b, and function as guide portions 5c that determine the positions of the springs 17 and prevent the dropping of the springs 17. The second lugs 5 are pushed to the fixing member 3 side, by which the second lugs 5 are supported. The second lugs 5 are movable in a direction in a plane, i.e., in a direction of expansion and contraction of the mirror 1. The areas of the end portions 16b of the adjusting screws 16 are previously set to be larger than or equal to the movable range of the second lugs 5.

If the mirror 1 is made of resin, the end portion 4b, the end portions 5b, the guide portion 4c and the guide portions 5c (i.e., respective protrusions provided on the first lug 4 and the second lugs 5 of the mirror 1) can be made of resin, and can be formed together with the molding of the mirror 1 (for example, formed by integral molding). Further, if the mirror 1 is made of metal, these can be made by machining, or can be made as separate components attached to the first lug 4 and the second lugs 5. Furthermore, even if the shape of the mirror 1 side of the contact portion and the shape of the fixing member 3 side of the contact portion are interchanged with each other, the same advantage can be obtained.

As described above, the first lug 4 and the second lugs 5 of the mirror 1 can be configured to have functions as the intermediate members. Therefore, the number of components can be reduced, and the cost and weight can be reduced. Further, the backlash between the first lug 4 and the second lugs 5 and other members can be eliminated, and therefore the accurate positioning can be enabled. Furthermore, the connection with disparate material is eliminated, and therefore the backlash due to the difference in the linear expansion coefficient does not occur even when the temperature changes, and a crack associated with the connection is not formed, with the result that the supporting mechanism having high accuracy and high reliability, can be obtained. And so fourth, it is clear that the same advantage as in Embodiment 1 can also be obtained, in other respect than the rigidity and the strength.

In the above described Embodiments 1 through 6, both of the pivot supporting portion and the slide supporting portion are provided. However, it is also possible to provide only one of the pivot supporting portion and the slider supporting portion. Further, in the above described Embodiments 1 through 6, the reflection surface 1a of the mirror 1 has the rotational aspheric surface. However, the reflection surface 1a is not limited to the rotational aspheric surface, but has only to be rotationally-symmetrical.

The invention claimed is:

1. A supporting mechanism of a reflector of a projection apparatus, said projection apparatus comprising a reflector having a reflection surface of a rotationally-symmetrical shape about an optical axis, and being configured to reflect light at an area of said reflection surface that does not include said optical axis, said supporting mechanism comprising:

a pivot supporting portion using a pivot mechanism including a member with a spherically-shaped end and a member with a bowl-shaped end contacting each other, said pivot supporting portion being configured to position said reflector at a position of said optical axis of said reflection surface or in the vicinity of said optical axis so that said reflector is rotatable about a pivot point as a rotation axis of said pivot mechanism;

a fixing member having a supporting surface that supports said reflector, and a plurality of slide supporting portions each of which includes a member with a substantially spherically-shaped end and a member with a flat end contacting each other at a point, said slide supporting portions being configured to slidably support said reflector with respect to said supporting surface of said fixing member, each of said slide supporting portions having an adjusting mechanism for adjusting a supporting position of said reflector in a heightwise direction, wherein said pivot supporting portion and said slide supporting portions support said reflector at least three points.

2. The supporting mechanism of the reflector according to claim 1, wherein each of said slide supporting portions has two contact members contacting each other, and at least one of said contact members is a screw whose position is adjustable in said heightwise direction.

3. The supporting mechanism of the reflector according to claim 1, wherein said pivot supporting portion has an adjusting mechanism for adjusting a supporting position of said reflector in said heightwise direction.

4. The supporting mechanism of the reflector according to claim 3, wherein said pivot supporting portion has two contact members contacting each other, and at least one of said contact members is a screw whose position is adjustable in said heightwise direction.

5. The supporting mechanism of the reflector according to claim 1, wherein said slide supporting portions support said reflector at bilaterally-symmetrical positions outside said reflection surface above a half of said reflection surface.

6. The supporting mechanism of the reflector according to claim 1, wherein said supporting surface of said fixing member is approximately parallel to a line connecting a lowermost point of an area of said reflection surface that reflects light and an uppermost point of said area.

7. The supporting mechanism of the reflector according to claim 1, wherein said pivot supporting portion and said slide supporting portion support said reflector so that a distance from said supporting surface of said fixing member to said reflection surface of said reflector is the same for both supporting portions.

8. The supporting mechanism of the reflector according to claim 1, wherein said pivot supporting portion and said slide supporting portion are formed of material whose linear expansion coefficient is smaller than a linear expansion coefficient of a material constituting said reflector.

9. The supporting mechanism of the reflector according to claim 1, wherein at least one of said pivot supporting portion, said slide supporting portion and said fixing member is formed of a material whose hardness is higher than a hardness of a material constituting said reflector.

10. A projection apparatus comprising:

said supporting mechanism of said reflector according to claim 1, and a projection optical system including said reflector.

* * * * *